United States Patent [19]

Woodman

[11] 4,098,081
[45] Jul. 4, 1978

[54] TIDAL POWER PLANT AND METHOD OF POWER GENERATION

[76] Inventor: Harvey R. Woodman, 311 Cedar Crest Ct., P.O. Box 271, Napavine, Wash. 98565

[21] Appl. No.: 768,390

[22] Filed: Feb. 14, 1977

[51] Int. Cl.² ............................................. F03B 13/12
[52] U.S. Cl. ....................................... 60/398; 60/407; 60/698; 417/100; 60/497
[58] Field of Search ................................. 60/497–508, 60/398, 698, 407, 411, 412; 417/100

[56] References Cited

U.S. PATENT DOCUMENTS

| | | | |
|---|---|---|---|
| 1,455,718 | 5/1923 | DeLong | 417/100 |
| 1,791,239 | 2/1931 | Braselton | 417/100 |
| 2,484,183 | 10/1949 | Paulson | 60/398 |
| 3,925,986 | 12/1975 | Barwick | 60/398 |

*Primary Examiner*—Allen M. Ostrager
*Attorney, Agent, or Firm*—Gene M. Grantham

[57] ABSTRACT

A plurality of tidal chambers are filled in succession during rising tide and then are allowed to sequentially empty during the half-cycle of falling tide. Power is generated by air flow across a turbine, as a manifold and valve means communicate air pressure from the tidal chambers during rising tide and vacuum pressure during falling tide. Sequential operation of the tidal chambers permits continuous generation of power during the full cycle of rising and falling tide.

4 Claims, 5 Drawing Figures

TIDAL POWER PLANT AND METHOD OF POWER GENERATION

BACKGROUND OF THE INVENTION

Prior inventions have utilized tidal power to generate air pressure to drive a turbine. A major disadvantage of these power plants is that they do not efficiently generate power uniformly over the full tidal cycle. An objective of this invention is to accomplish uniform generation of power, during lulls and stagnant periods and very low tides, by the sequential operation of a plurality of chambers.

One proposed solution to this problem is found in the Paulsen U.S. Pat. No. 2,484,183 which discloses a two compartment chamber. A primary chamber generates positive pressure during rising tide and vacuum during falling tide. A secondary chamber stores compressed air during rising tide and later discharges that air to extend the period of operation of the power plant. This system requires an extremely large chamber with enough height to contain the entire change in sea water height between high and low tide. A chamber of this size would be very expensive and also would be inefficient during small tidal fluctuations.

SUMMARY OF THE INVENTION

A plurality of tidal chambers are utilized, with the objective of producing substantially continuous generation of to flow across a turbine during the entire cyclical period of rising and falling tide. The difference in level between successive high and low waters, the tidal range, may vary from day to day at any particular location. Also, the tidal waveform may be very different at various geographical locations, such as a bay, estuary or stretch of coast line, or in different parts of the world. In a typical Puget Sound waveform, for example, the tide may rise to a maximum, drop to an intermediate level, rise to a second high tide and finally return to low tide in a twenty-four hour period. The tidal waveform may be very different from a sine curve, with slack water periods, diurnal inequalities or overlapping harmonic constituents. An objective of this invention is to maximize storage of energy during these irregular or non-sinusidal tidal waveforms, and spread power generation as uniformly as possible over the entire period.

The plurality of tidal chambers are filled and evacuated in a sequence which is manipulated to conform to the predicted tidal waveform for a particular geographical site and season. The number of chambers and exact sequence of operation are selected to optimize efficiency and uniform power generation.

During rising tide, valve means are sequentially opened on each of the tanks to permit air flow from the respective tanks, through manifold means, to the inlet of a turbine for generation of electrical or mechanical power. Each tank is open to sea water at its lower end so that the level within a tank rises to the external tide level whenever the valve means are actuated for expulsion of air from the tank into the manifold.

Each chamber is allowed to fill, at the same time communicating positive air pressure into the manifold. The intervals during which the respective chambers generate positive pressure overlap for uniform and continuous power generation during rising tide and also extend through any stagnant or slack periods of high tide and into falling tide. This is possible because the last of the chambers to be filled will be submerged after the tide has peaked at its maximum height and this chamber will in turn fill and generate air pressure when valve means are actuated to communicate air pressure from that chamber to the manifold.

Similarly, during falling tide, sea water is evacuated from the respective chambers in a sequence which extends generation of vacuum pressure over a uniform period which is greater than the interval from high to low tide.

DESRIPTION OF THE DRAWINGS

Figure 3:
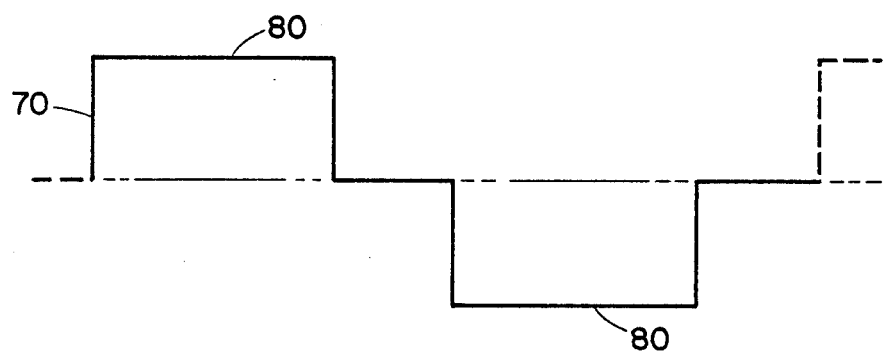
Figure 4:
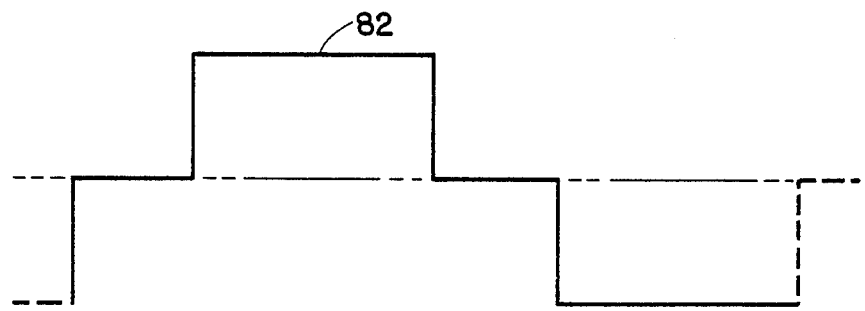
Figure 5:
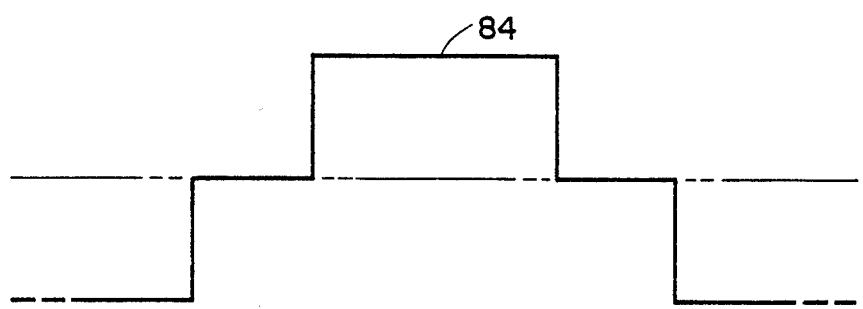

FIGS. 3, 4 and 5 illustrate power generation by chambers 1, 2 and 3 respectively in a three chambered, tidal power plant. The cross hatched areas above the axis indicate generation of air pressure by that chamber and cross hatched areas below the axis indicate generation of vacuum.

DETAILED DESCRIPTION OF THE INVENTION

Figure 1:
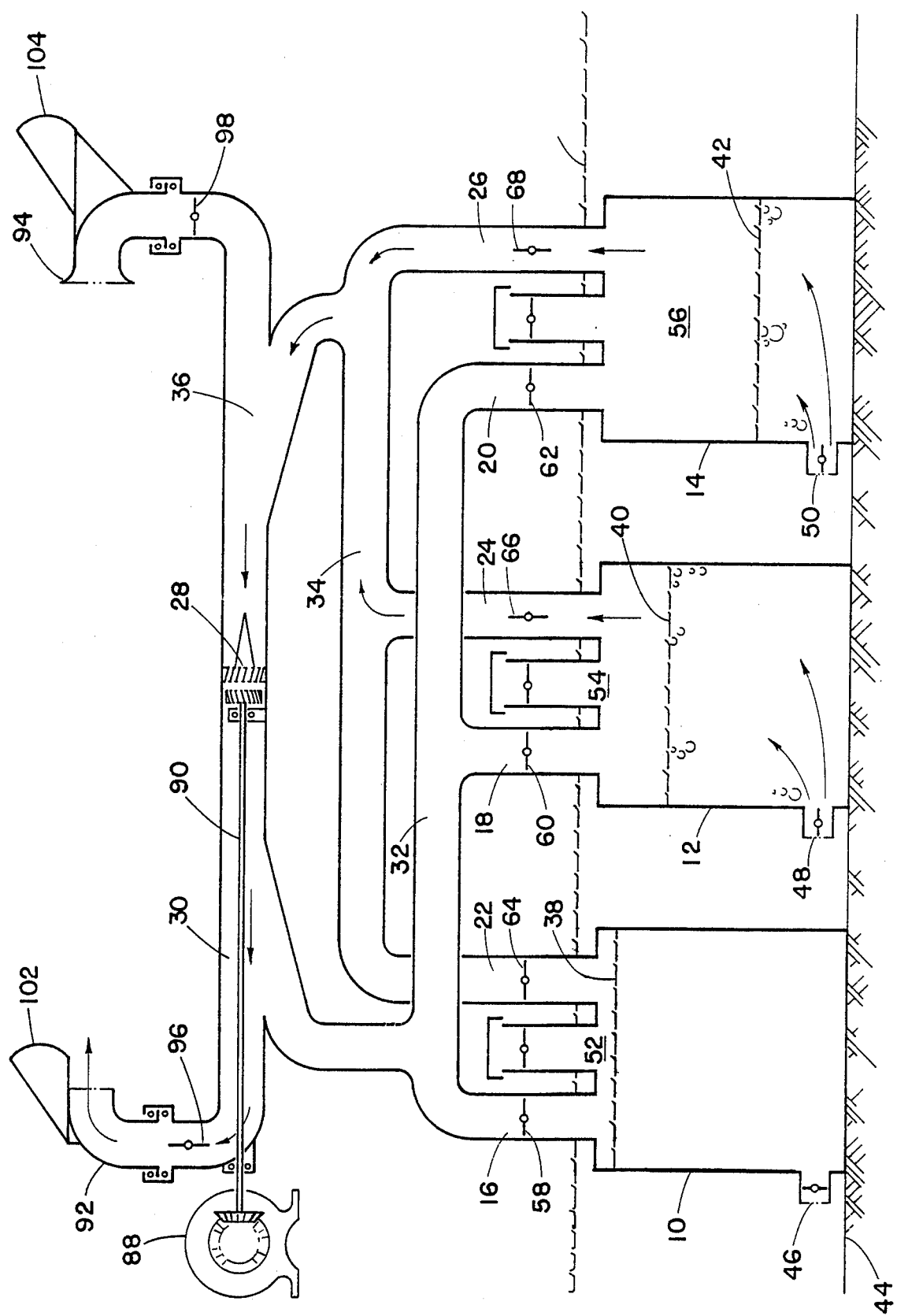
FIG. 1 is a cross sectional view of a three chambered, tidal power plant.

A preferred embodiment of the invention having three tidal chambers is illustrated in FIG. 1. The three tidal chambers, 10, 12, 14 are anchored to the sea bed 44. Seawater inlet means 46, 48, 50 at the bottom of each of the plurality of chambers permit water to enter the respective chambers and rise to the outside tide level 98. The location of the tidal chambers is selected so that the inlet means 46, 48, 50, will always be submerged, even at minimum or neap tides. As water rises in the first chamber 10, for example, air 52 is forced under pressure through the chamber outlet 22 into the pressure manifold 34 which directs the flow of air to the inlet 36 of turbine means 28. The air flow drives the turbine 28 which generates mechanical or electrical power. Similarly, the second and third chambers 12, 14 communicate air flow through their respective outlets 24, 26 to the pressure manifold 34. Valve means 64, 66, 68 on each of the tanks are actuated to sequentially communicate air pressure from the various tanks 10, 12, 14 to the pressure manifold 34.

As tide level 98 falls, water may be stored within the air tight chambers 10, 12, 14. Again using the first chamber 10 as an example, the water level 38 within the chamber 10 will fall to reach the external tide height 98 whenever the water outlet 46 and vacuum outlet 16 are opened. The seawater outlet ports 46, 48, 50 are normally in an open position and actuation of valve means 58, 60, 62 communicates vacuum pressure to the outlet 36 of the turbine 28. Actuation of valve means 58, 60, 62 permits sequential emptying of the respective chambers 10, 12, 14 for generation of vacuum at the turbine outlet 30 during falling tide.

FIGS. 3, 4 and 5 illustrate a preferred sequence of working periods for power generation by each of the three chambers 10, 12, 14 in relation to a typical tidal waveform during a 24 hour period. The graph in FIG. 1 indicates low tide 70 at time 0, rising to high tide 72 approximately 8 hours later. The tide level drops to an intermediate height 74 approximately half way through the 24 hour period and then rises to a second high tide 76. At the end of 24 hours, the tide has again fallen to low tide 78.

The amplitude and timing of the tidal fluctuations will vary from day to day as will the maximum and minimum tide levels. The working periods 80 indicated in FIG. 2 illustrate a preferred timing sequence, whereby power generation is spread as uniformly as possible throughout the full 24 hour cycle.

Figure 2:
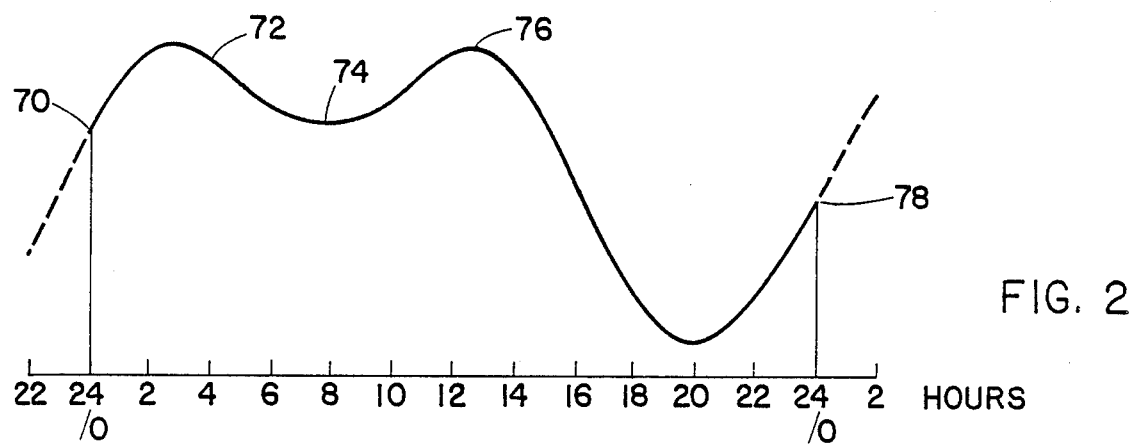
FIG. 2 is a graph of a typical waveform with tide height indicated by the longitudinal scale and time in hours indicated by the horizontal scale.

At low tide 70, designated in FIG. 2 at time 0, the first chamber 10 is generating air pressure and continues to do so for eight hours. The seawater inlet 46 is in its normal open position and valve means 64 is open, communicating pressure to the turbine inlet 36. The outlet 16 is sealed by closing valve means 58. During this 8 hour segment, sea water will rise in the first chamber 10 at the same rate as the external rising tide 98, and force air pressure into the turbine inlet 36.

At the end of 8 hours, the tide will have reached its peak 72, in this example, ending the segment of power generation from the first chamber 10. This is illustrated in FIG. 3 by the end of the cross-hatched bar 80 after eight hours. Referring to FIG. 4, the generation of air pressure by the second chamber 12 is indicated by the cross-hatched segment 82 from the 4th to the 12th hour. The filling of this chamber 12 is delayed 4 hours out of phase from the first chamber 10 in order to continue generation of air pressure after the external water level has peaked at high tide. As illustrated in FIG. 5, the third chamber is utilized for power generation in an 8 hour interval which is staggered an additional 4 hours out of phase from the first 10 and second 12 chambers. The entire segment of generation 84 of air pressure by the third chamber 14 occurs during a period when the tide level is stagnant. By delaying the entry of sea water into this chamber 14, power generation can be accomplished even when there is only a slight variation in the tide level.

In the second 12 hours of falling tide, as illustrated in FIG. 2, the three chambers 10, 12, 14 are sequentially emptied as depicted graphically in FIGS. 3, 4 and 5. As seawater empties through the portals 46, 48, 50 at the bottom of the chambers 10, 12, 14, air is drawn into the chambers through vacuum inlets 16, 18, 20, thereby communicating vacuum through the manifold 32 to the turbine outlet 30. The actuation of valve means 58, 60, 62 controls the sequence of evacuation of the chambers 10, 12, 14 to extend generation of vacuum uniformly over a 16 hour period.

I claim:

1. Apparatus for use in conjunction with a turbine or other power generation means, for generation of power from tidal energy, comprising:
   a. a plurality of tidal chambers having sea water inlet means; and
   b. first manifold means, communicating air flow generated by rising tidal level within the tidal chambers to the said power generating means; and
   c. second manifold means, communicating air flow generated by falling tidal level within the tidal chambers t said power generating means; and
   d. valve means enabling sequential communication of air flow from the respective chambers through said first and second manifold means.

2. Apparatus for use in conjunction with a turbine or other power generation means, for generation of power from tidal energy, comprising:
   a. a plurality of tidal chambers having sea water inlet means; and
   b. first manifold means, communicating air flow generated by rising tidal level within the tidal chambers to the said power generating means; and
   c. second manifold means, communicating air flow generated by falling tidal level within the tidal chambers to said power generating means; and
   d. valve means, enabling sequential communication of air flow from the respective chambers through said first and second manifold means.
   e. directional air inlet means, communicating air flow of prevailing external wind to said power generating means.

3. In a tidal power plant for the sequential communication of air flow from a plurality of tidal chambers to a turbine or other power generation means, the method comprising:
   a. actuating inlet means so as to permit entry of sea water into one or more tidal chambers, thereby generating air pressure for communication to said power generation means; and
   b. sequentially actuating inlet means so as to permit entry of sea water into additional tidal chambers during delayed intervals, thereby generating air pressure within said chambers out of phase with tide level fluctuations; and
   c. actuating outlet means so as to permit evacuation of sea water from one or more tidal chambers, thereby generating vacuum pressure for communication to said power generation means; and
   d. sequentially actuating outlet means so as to permit evacuation of sea water from additional tidal chambers during delayed intervals, thereby generating vacuum pressure within said chambers out of phase with tide level fluctuations.

4. In a tidal power plant for the sequential communication of air flow from a plurality of tidal chambers to a turbine or other power generation means, the method comrising:
   a. actuating inlet means so as to permit entry of sea water into one or more tidal chambers, thereby generating air pressure for communication to said power generation means; and
   b. sequentially actuating inlet means so as to permit entry of sea water into additional tidal chambers during intervals of high tide, thereby generating air pressure out of phase with rising tide level; and
   c. sequentially actuating inlet means so as to permit entry of sea water to additional tidal chambers during intervals subsequent to peak high tide, thereby generating air pressure out of phase with rising tide level; and
   d. actuating outlet means so as to permit evacuation of sea water from one or more tidal chambers, thereby generating vacuum pressure for communication to said power generation means; and
   e. sequentially actuating outlet means so as to permit evacuation of sea water from additional tidal chambers during intervals of falling tide, thereby generating vacuum pressure out of phase with falling tide level; and
   f. sequentially actuating outlet means of tidal chambers during intervals subsequently to peak low tide level, thereby generating vacuum pressure out of phase with falling tide level.

* * * * *